US011928999B2

(12) United States Patent
Song et al.

(10) Patent No.: US 11,928,999 B2
(45) Date of Patent: Mar. 12, 2024

(54) DISPLAY DEVICE AND METHOD OF DRIVING THE SAME

(71) Applicant: LG Display Co., Ltd., Seoul (KR)

(72) Inventors: Won-Seok Song, Paju-si (KR); Su-Bin Park, Paju-si (KR); Sung-Chang Park, Paju-si (KR); Kyeong-Min Moon, Paju-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 17/121,386

(22) Filed: Dec. 14, 2020

(65) Prior Publication Data

US 2021/0201738 A1 Jul. 1, 2021

(30) Foreign Application Priority Data

Dec. 30, 2019 (KR) ........................ 10-2019-0178632

(51) Int. Cl.
*G09G 3/20* (2006.01)
*G09G 5/10* (2006.01)

(52) U.S. Cl.
CPC ................ *G09G 3/20* (2013.01); *G09G 5/10* (2013.01); *G09G 2310/0267* (2013.01); *G09G 2310/0275* (2013.01); *G09G 2310/0286* (2013.01); *G09G 2320/064* (2013.01); *G09G 2320/0653* (2013.01); *G09G 2320/0673* (2013.01)

(58) Field of Classification Search
None
See application file for complete search history.

(56) References Cited

U.S. PATENT DOCUMENTS

| | | | |
|---|---|---|---|
| 9,077,987 | B2 | 7/2015 | Lee et al. |
| 9,520,089 | B2 | 12/2016 | Kim et al. |
| 9,865,194 | B2 | 1/2018 | Koo et al. |
| 10,074,330 | B2 | 9/2018 | Tseng et al. |
| 10,810,930 | B2 | 10/2020 | Shim et al. |

(Continued)

FOREIGN PATENT DOCUMENTS

| | | | |
|---|---|---|---|
| CN | 103854620 | B | 6/2016 |
| CN | 108109583 | A | 6/2018 |

(Continued)

OTHER PUBLICATIONS

Taiwan Intellectual Property Office, Office Action, TW Patent Application No. 109144328, dated Dec. 9, 2021, nine pages.

(Continued)

*Primary Examiner* — Andre L Matthews
(74) *Attorney, Agent, or Firm* — Fenwick & West LLP

(57) ABSTRACT

The present disclosure relates to a display device and a method of driving the same, and more specifically, to a display device for preventing a user from recognizing a change in luminance when a frame frequency is changed, and a method of driving the same. A display device of the present disclosure includes a display panel including a plurality of pixel regions, a gate driver configured to sequentially supply light emission control signals to horizontal lines of the display panel, a data driver configured to supply a data signal corrected by a source voltage to the display panel, and a dimming controller configured to control whether to gradually change a frame frequency and gamma correction data according to a duty ratio of the light emission control signal.

25 Claims, 9 Drawing Sheets

(56) References Cited

U.S. PATENT DOCUMENTS

| | | | | |
|---|---|---|---|---|
| 11,538,434 | B2 | 12/2022 | Ran et al. | |
| 2012/0256908 | A1 | 10/2012 | Lee et al. | |
| 2013/0222437 | A1 | 8/2013 | Ka et al. | |
| 2013/0321254 | A1* | 12/2013 | Kim | G09G 3/2014 345/102 |
| 2014/0152720 | A1 | 6/2014 | Kim et al. | |
| 2015/0097764 | A1* | 4/2015 | Pyo | G09G 3/3233 345/77 |
| 2016/0148556 | A1 | 5/2016 | Tseng et al. | |
| 2016/0178835 | A1 | 6/2016 | Kim et al. | |
| 2016/0372077 | A1 | 12/2016 | Koo et al. | |
| 2017/0124962 | A1* | 5/2017 | Oh | G09G 3/3648 |
| 2018/0151109 | A1 | 5/2018 | Shim et al. | |
| 2018/0151593 | A1* | 5/2018 | Inoue | G09G 3/3648 |
| 2018/0226032 | A1 | 8/2018 | Kim et al. | |
| 2021/0035505 | A1* | 2/2021 | Kwon | G09G 3/2007 |
| 2022/0028350 | A1 | 1/2022 | Ran et al. | |

FOREIGN PATENT DOCUMENTS

| | | | |
|---|---|---|---|
| CN | 110491351 | A | 11/2019 |
| KR | 10-2007-0110714 | A | 11/2007 |
| KR | 10-2012-0114883 | A | 10/2012 |
| KR | 10-2016-0149365 | A | 12/2016 |
| TW | 201619940 | A | 6/2016 |

OTHER PUBLICATIONS

Second Office Action, Taiwan Intellectual Property Office Patent Application No. 109144328, dated May 6, 2022, 14 pages.

China National Intellectual Property Administration, Office Action, Chinese Patent Application No. 202011491425.9, dated Dec. 18, 2023, 18 pages.

* cited by examiner

| PARAMETERS | RANGES |
|---|---|
| F1 | F1 ≥ 0 Hz |
| F2 | F2 ≥ 0 Hz |
| GDC_ON | GDC_ON = ON or OFF |
| N | N > 0 |
| GDC_EVST_EN | GDC_EVST_EN = ENABLE or DISABLE |
| GDC_SRC_EN | GDC_SRC_EN = ENABLE or DISABLE |
| M | M > 0 |
| D1 | 0 ≤ D1 ≤ 100 |
| D2 | 0 ≤ D2 ≤ 100 |
| GS1 | GS1 ≥ 0 |
| GS2 | GS2 ≥ 0 |

FIG. 3

[FIRST EXAMPLE]

DISPLAY DEVICE AND METHOD OF DRIVING THE SAME

CROSS-REFERENCE TO RELATED APPLICATIONS

The present application claims priority from and the benefit under 35 U.S.C § 119(a) of Korean Patent Application No. 10-2019-0178632, filed on Dec. 30, 2019, which is hereby incorporated by reference in its entirety.

BACKGROUND

1. Technical Field

The present disclosure relates to a display device and a method of driving the same, and more specifically, to a display device for preventing a user from recognizing a change in luminance when a frame frequency is changed, and a method of driving the same.

2. Discussion of the Related Art

Recently, display devices that are mainly used by users include flat panel display devices such as liquid crystal displays and organic light-emitting display devices. Further, flexible display devices having flexibility to be bendable, foldable, or rollable are developed and widely used.

When a display device displays a still image or an image having a small change rate of grayscale between frames, the display device may be driven at a low speed by lowering a frame frequency. On the contrary, when the display device displays an image having a large change rate of grayscale between frames, the display device may be driven at a high speed by increasing a frame frequency.

As described above, in the method of changing the frame frequency of the display device according to the characteristic of the image, there is no need to always drive the display device at a high frequency and thus there is an advantage in that power consumption may be reduced.

Meanwhile, the human eye responds nonlinearly to changes in luminance and has a characteristic that is more sensitive to changes in luminance, especially in dark areas. Accordingly, when gray scale data of the image is set linearly in correspondence with the luminance, the dark areas cannot be displayed so that luminance of a portion thereof corresponds to that of the grayscale data of the image. Therefore, when the luminance is changed in the dark areas, a posterization effect may occur in which the image is cut off.

In order to prevent the posterization effect from occurring, the display device may perform gamma encoding in which the grayscale data of the image is nonlinearly set to correspond to luminance.

Further, since a degree to which the human eye responds nonlinearly to a change in luminance varies according to the frame frequency, gamma correction data may have different values for each frame frequency.

Therefore, when the display device changes the frame frequency according to the type of image, the gamma correction data is also changed, but the gamma correction data is different according to the frame frequency, and thus an error may occur in the gamma encoding so that the change in luminance may be instantly recognized.

Since the above phenomenon causes the display quality to degrade, there is a demand for a method which allows a change in luminance not to be recognized when a frame frequency is changed.

SUMMARY

Accordingly, the present disclosure is directed to a display device and a method of driving the same that substantially obviate one or more of the problems due to limitations and disadvantages of the related art.

An object of the present disclosure is to provide a display device which allows a change in luminance not to be recognized when a frame frequency is changed, and a method of driving the same.

One aspect of the present disclosure provides a display device that includes a display panel including a plurality of pixel regions, a gate driver configured to sequentially supply light emission control signals to horizontal lines of the display panel, a data driver configured to supply a data signal corrected by a source voltage to the display panel, and a dimming controller configured to control whether to gradually change a frame frequency and gamma correction data according to a duty ratio of the light emission control signal.

Another aspect of the present disclosure provides a method of driving a display device. The method includes inputting a first duty ratio and a second duty ratio, inputting a first frame frequency (F1), a second frame frequency (F2), the number (N) of changed frequencies, whether or not gradual dimming control is on, and duty ratios of a light emission control signal, and when the gradual dimming control is in an on state and the duty ratio of the light emission control signal is within a range from the first duty ratio to the second duty ratio, controlling a frame frequency and gamma correction data so as to be gradually changed.

Advantages and features of the disclosure will be set forth in part in the description which follows and in part will become apparent to those having ordinary skill in the art upon examination of the following or may be learned from practice of the disclosure. Other advantages and features of the disclosure herein may be realized and attained by the structure particularly pointed out in the written description and claims hereof as well as the appended drawings.

It is to be understood that both the foregoing general description and the following detailed description are explanatory and are intended to provide further explanation of the disclosure as claimed.

BRIEF DESCRIPTION OF THE DRAWINGS

The accompanying drawings, which are included to provide a further understanding of the disclosure, are incorporated in and constitute a part of this specification, illustrate implementations of the disclosure and together with the description serve to explain the principles of embodiments of the disclosure.

FIG. 3 is a table showing parameters for controlling a dimming controller.

DETAILED DESCRIPTION

Hereinafter, the present disclosure will be described in detail with reference to the accompanying drawings.

Figure 1:
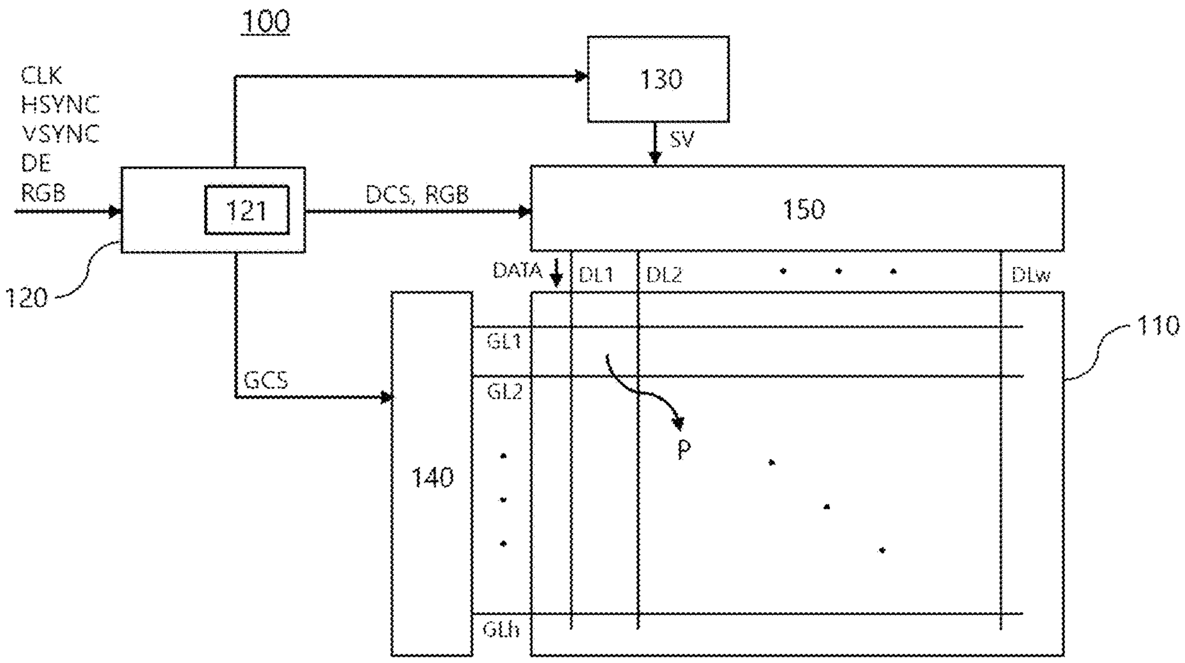
FIG. 1 is a block diagram illustrating a display device according to an embodiment of the present disclosure.

FIG. 1 is a block diagram schematically illustrating a display device according to an embodiment of the present disclosure.

In description of the present disclosure, an example of a display panel using organic light-emitting diodes is described, but the present disclosure is not limited thereto, and the technical scope of the present disclosure may be applied to a liquid crystal display panel or a display panel operated in another manner.

A display device 100 according to the embodiment of the present disclosure may include a display panel 110, a timing controller 120, a gamma correction unit 130, a gate driver 140, and a data driver 150.

The display panel 110 may include a plurality of pixel regions P, and the plurality of pixel regions P may be disposed in the form of a matrix.

Gate lines GL1 to GLh and data lines DL1 to DLw may cross on the display panel 110 to form the pixel regions P. The gate lines GL1 to GLh may extend and be connected to the gate driver 140 and may include a plurality of scan lines, light-emitting control lines, and the like. Further, the data lines DL1 to DLw may extend to the outside of the display panel 110 and be connected to the data driver 150.

The timing controller 120 may receive an image signal RGB and a clock signal CLK as inputs from a host system (not illustrated). Further, the timing controller 120 may receive a horizontal synchronization signal HSYNC and a vertical synchronization signal VSYNC, which are timing signals, and a data enable signal DE as inputs.

The clock signal CLK is a reference signal used when the timing controller 120 is synchronized with the gate driver 140 and the data driver 150.

The horizontal synchronization signal HSYNC represents a time it takes to display one horizontal line in one frame, and the vertical synchronization signal VSYNC represents a time it takes to display one frame.

The data enable signal DE is a signal that activates the pixel region P located on one horizontal line.

The timing controller 120 may generate a gate control signal GCS for controlling an operation of the gate driver 140 and a data control signal DCS for controlling an operation of the data driver 150 using the horizontal synchronization signal HSYNC, the vertical synchronization signal VSYNC, and the data enable signal DE, and then transmit the gate control signal GCS and the data control signal DCS to the gate driver 140 and the data driver 150, respectively. Further, the timing controller 120 may transmit the image signal RGB to the data driver 150.

The timing controller 120 may include a dimming controller 121. The dimming controller 121 may control a light emission control signal and gamma correction data to be changed when a frame frequency is changed, and a driving method thereof will be described below.

The gamma correction unit 130 may include an integrated circuit (IC) in which the gamma correction data is stored and may generate a source voltage SV according to the gamma correction data and transmit the source voltage SV to the data driver 150. The gamma correction data may have different values for each frame frequency.

The gate driver 140 may have a gate in panel structure located inside the display panel 110 or a structure located outside the display panel 110. The gate driver 140 may include a shift register having a plurality of stages and may generate a plurality of gate driving signals using the gate control signal GCS.

The gate control signal GCS may include a gate start pulse GSP, a gate shift clock GSC, a gate output enable GOE, and the like. Further, the plurality of gate driving signals may include a scan signal for turning on or off a transistor included in the pixel region, and a light emission control signal for turning on or off a light emission control transistor.

The gate start pulse GSP may control so that the gate driving signal is generated in a first stage of the shift register. The gate shift clock GSC may control so that the gate driving signal is generated in a next stage. The gate output enable GOE may control an output timing of the gate driving signal to prevent the gate driving signals from being output simultaneously from different stages.

The scan signal may control whether a thin film transistor included in the pixel region P is turned on or off, and the light emission control signal may control a current flowing through the light-emitting diodes.

In an embodiment of the present disclosure, the light-emitting diode may be controlled by a duty driving method in which an on state, in which the current passes through the light emitting diodes included in the pixel region P, and an off state, in which the current does not pass through the light emitting diodes, are repeated. In particular, in one duty period, which is a period in which the on state and the off state are repeated, an amount of light emission may be controlled by adjusting the duty ratio, which is a ratio occupied by the on state.

The data driver 150 may convert the image signal RGB, which is a digital signal, into a data signal DATA, which is an analog signal, and the data signal DATA may be latched by one horizontal section and be simultaneously transmitted to the display panel 110 through all the data lines DL1 to DLw. The data driver 150 may adjust a size of the data signal DATA according to the source voltage SV transmitted from the gamma correction unit 130.

The data control signal DCS may include a source start pulse SSP, a source shift clock SSC, a source output enable SOE, and the like.

The source start pulse SSP may control a sampling start timing in response to the image signal RGB, which is a digital signal. The source shift clock SSC may control a sampling timing for each horizontal line in response to a rising or falling edge. The source output enable SOE may control an output timing of the data signal DATA.

In the present disclosure, a structure of the shift register will be described as follows.

Figure 2:
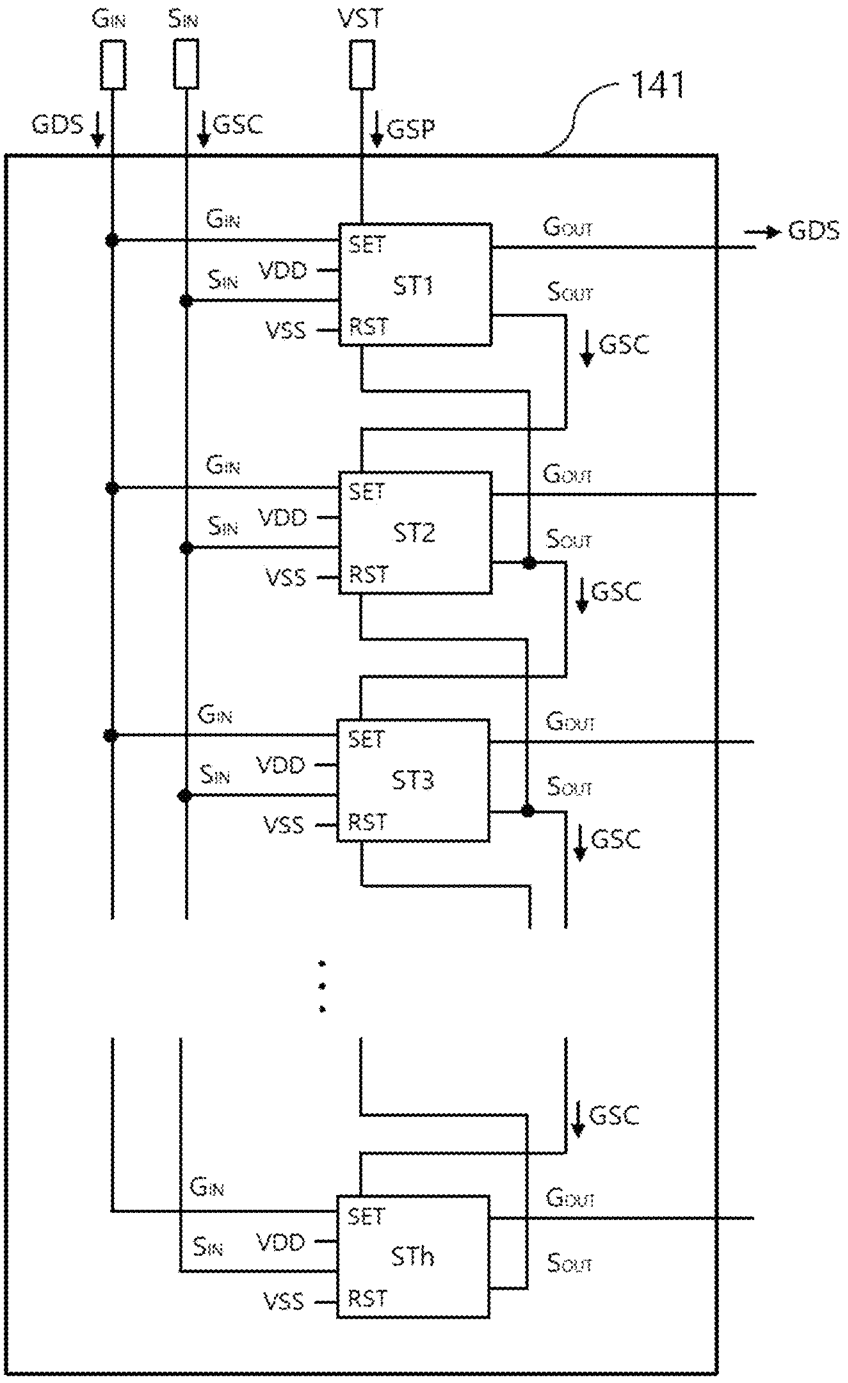
FIG. 2 is a block diagram illustrating a shift register included in a gate driver.

FIG. 2 is a block diagram schematically illustrating a shift register included in a gate driver.

A shift register 141 included in the gate driver 140 of FIG. 1 may include a plurality of stages ST1 to STh that are dependently connected.

Each of the plurality of stages ST1 to STh may include a set input terminal SET, a reset input terminal RST, a driving voltage input terminal VDD, a low-potential voltage input terminal VSS, a gate driving signal input terminal $G_{IN}$, and a gate shift clock input terminal $S_{IN}$.

Further, each of the plurality of stages ST1 to STn may include a gate driving signal output terminal $G_{OUT}$ and a gate shift clock output terminal $S_{OUT}$.

In FIG. 2, only one gate driving signal input terminal $G_{IN}$ and one gate driving signal output terminal $G_{OUT}$ are illustrated, but in order to input and output a plurality of gate driving signals GDS, each of stages ST1 to STh may include a plurality of gate driving signal input terminals $G_{IN}$ and a plurality of gate driving signal output terminals $G_{OUT}$. Further, the gate driving signals GDS may include a scan signal, a light emission control signal, and the like.

The gate driving signal output terminals $G_{OUT}$ may be connected to the gate lines GL1 to GLh of FIG. 1 arranged for each horizontal line on the display panel 110 of FIG. 1 in one-to-one correspondence.

Further, the gate shift clock output terminal $S_{OUT}$ may be connected to the set input terminal SET of the stage corresponding to the next horizontal line and may be connected to the reset input terminal RST of the stage corresponding to the previous horizontal line.

A first stage ST1 may receive the gate start pulse GSP through the set input terminal SET connected to a start pulse input terminal VST of the shift register 141.

In this case, the first stage ST1 is in an enabled state. Further, the first stage ST1 may output the gate driving signal GDS received from the gate driving signal input terminal $G_{IN}$ through the gate driving signal output terminal $G_{OUT}$ and transmit the gate driving signal GDS to a first gate line GL1 of FIG. 1.

Further, the first stage ST1 may output the gate shift clock GSC received from the gate shift clock input terminal $S_{IN}$ through the gate shift clock output terminal $S_{OUT}$ and transmit the gate shift clock GSC to the set input terminal SET of a second stage ST2, which is the next stage.

The second stage ST2 is in an enabled state after receiving the gate shift clock GSC through the set input terminal SET. Further, the second stage ST2 may output the gate driving signal GDS received from the gate driving signal input terminal $G_{IN}$ through the gate driving signal output terminal $G_{OUT}$ and transmit the gate driving signal GDS to a second gate line GL2 of FIG. 1.

Further, the second stage ST2 may output the gate shift clock GSC received from the gate shift clock input terminal $S_{IN}$ through the gate shift clock output terminal $S_{OUT}$, transmit the gate shift clock GSC to the set input terminal SET of a third stage ST3, which is the next stage, and transmit the gate shift clock GSC to the reset input terminal RST of the first stage ST1, which is the previous stage.

In this case, since the first stage ST1 receives the gate shift clock GSC through the reset input terminal RST, the first stage ST1 is in a disabled state. Further, since the third stage ST3 receives the gate shift clock GSC through the set input terminal SET, the third stage ST3 is in an enabled state. That is, the gate shift clock GSC output from one stage makes the previous stage into a disabled state and the next stage into an enabled state so that the gate driving signal GDS may be sequentially output.

Until the last stage STh, the same operation method as that of the first and second stages ST1 and ST2 may be performed. Accordingly, the gate driving signals GDS may be sequentially output for each gate line GL1 to GLh of FIG. 1 so that an image may be displayed.

In FIG. 2, the gate shift clock output terminal $S_{OUT}$ of one stage is illustrated as being connected to the reset input terminal RST of the previous stage and the set input terminal SET of the next stage, but the present disclosure is not limited thereto, and the gate shift clock output terminal $S_{OUT}$ may be connected to the reset input terminal RST of the stage which is as far away as the number of k previously and may be connected to the set input terminal SET which is as far away as the number of k afterward, k is an integer equal to or greater than 1. Here, when it is assumed that the number of the stages is h, k may be an integer between 1 and h−1, h is an integer equal to or greater than 2.

Meanwhile, in the display device according to the embodiment of the present disclosure, when the frame frequency is changed, the frame frequency and the gamma correction data are gradually changed by the dimming controller 121 of FIG. 1, which will be described as follows.

FIG. 3 is a table showing parameters for controlling the operation of the dimming controller.

The dimming controller 121 of FIG. 1 may be an IC type element and may be operated to gradually change or not change the frame frequency and the gamma correction data according to the received parameters. Further, in order to store the received parameters, the dimming controller 121 of FIG. 1 may include a parameter storage unit (not illustrated) such as a register, a memory, or the like.

The parameters input to the dimming controller 121 of FIG. 1 may include first and second frame frequencies F1 and F2, a dimming control GDC_ON, the number N (N is an integer equal to or greater than 2) of frequencies, an EM control GDC_EVST_EN, a source control GDC_SRC_EN, the number M (M is an integer equal to or greater than 2) of duties, first and second duty ratios D1 and D2, pieces of first and second gamma correction data GS1 and GS2, and the like.

The parameters may be received from the host system (not illustrated) or may be directly set by the dimming controller 121 of FIG. 1.

The first frame frequency F1 represents a current frame frequency. In order to store the first frame frequency F1, a space of eight bits or more may be allocated to the parameter storage unit (not illustrated).

The second frame frequency F2 represents a frame frequency which will be changed according to the characteristic of the image. When displaying a still image or an image with a small change rate of gray scale between frames, the current frame frequency may be reduced, and when displaying an image with a large change rate of grayscale between frames, the current frame frequency may be increased.

In order to store the second frame frequency F2, a space of eight bits or more may be allocated to the parameter storage unit (not illustrated).

The dimming control GDC_ON allows the dimming controller 121 of FIG. 1 to gradually change the frame frequency and the gamma correction data or not. When the parameter is in an on state, the frame frequency and the gamma correction data are gradually changed, and when the parameter is in an off state, the frame frequency and the gamma correction data are not changed gradually.

In order to store the dimming control GDC_ON, a space of one bit or more may be allocated to the parameter storage unit (not illustrated).

The number N of frequencies represents the number of different frame frequencies appearing in the process of gradually changing the frame frequencies. In order to store the number N of frequencies, a space of eight bits or more may be allocated to the parameter storage unit (not illustrated).

The frame frequencies that are gradually changed may have a value between the first and second frame frequencies F1 and F2. Further, the frame frequencies that are gradually changed may form an arithmetic sequence. In this case, a tolerance d of the arithmetic sequence may be obtained using Equation 1 below.

$$d = \frac{(F2 - F1)}{(N+1)} \quad \text{[Equation 1]}$$

Further, the N frame frequencies appearing in the gradual change process may be obtained using Equation 2 below.

$$i^{th}\ \text{frequency} = F1 + d \times i\ (1 \le i \le N, \text{ and } i \text{ is an integer}) \quad \text{[Equation 2]}$$

For example, in the case in which the number N of frame frequencies that are gradually changed when the frame frequency is changed from 60 Hz to 90 Hz is set to four, the tolerance d becomes (90–60)/(4+1)=6. Accordingly, the tolerance becomes 6 Hz so that the frame frequencies may be gradually changed in the order of 60 Hz, 66 Hz, 72 Hz, 78 Hz, 84 Hz, and 90 Hz.

The EM control GDC_EVST_EN allows the dimming controller 121 of FIG. 1 to determine whether to gradually change the frame frequencies by adjusting a period in which the light emission control signal is output. When the parameter is in an enabled state, the frame frequencies are gradually changed, and when the parameter is in a disabled state, the frame frequencies are not changed gradually.

In order to gradually change the frame frequencies, the dimming controller 121 of FIG. 1 may control the timing controller 120 of FIG. 1 to change the duty period of the light emission control signal.

In order to store the EM control GDC_EVST_EN, a space of one bit or more may be allocated to the parameter storage unit (not illustrated).

The source control GDC_SRC_EN allows the dimming controller 121 of FIG. 1 to determine whether to gradually change the gamma correction data. When the parameter is in an enabled state, the gamma correction data is gradually changed, and when the parameter is in a disabled state, the gamma correction data is not changed gradually.

In order to gradually change the gamma correction data, the dimming controller 121 of FIG. 1 may change the gamma correction data stored in the gamma correction unit 130 of FIG. 1. In order to store the source control GDC_SRC_EN, a space of one bit or more may be allocated to the parameter storage unit (not illustrated).

The number of M of duties represents the number of duty periods of the light emission control signals output in one frame. By adjusting the number of duty periods in one frame, a refresh rate of the frame may be controlled.

In order to store the number of M of duties, a space of eight bits or more may be allocated to the parameter storage unit (not illustrated).

The first and second duty ratios D1 and D2 represent a range of the duty ratios of the light emission control signals.

When the luminance is very large or small, a change in luminance may not be recognized even when the frame frequency is changed. Therefore, by gradually changing the frame frequency and the gamma correction data only in a region in which a change in luminance can be recognized, it is possible to prevent unnecessary gradual change of the frame frequency and the gamma correction data from occurring in the region in which the change in luminance cannot be recognized.

The luminance may be changed by adjusting the current flowing through the light-emitting diode, and the current flowing through the light-emitting diode may be changed by adjusting the duty ratio of the light emission control signal. That is, when the duty ratio of the light emission control signal is large, an amount of the current flowing through the light-emitting diode may be increased and thus the luminance may be increased, and when the duty ratio of the light emission control signal is small, the amount of the current flowing through the light-emitting diode may be reduced and thus the luminance may be reduced.

Therefore, since the duty ratio of the light emission control signal corresponds to the luminance, the region in which the change in luminance can be recognized and the region in which the change in luminance cannot be recognized may be distinguished using the duty ratio. When the duty ratio of the light emission control signal is within a predetermined duty ratio range corresponding to the region in which the change in luminance can be recognized, the dimming controller 121 of FIG. 1 may control the gradual change of the frame frequency and the gamma correction data.

For example, in the case in which the first duty ratio D1 is set to 20% and the second duty ratio D2 is set to 80%, only when the duty ratio of the light emission control signal ranges from 20% to 80%, the dimming controller 121 of FIG. 1 may control the gradual change of the frame frequency and the gamma correction data.

The first gamma correction data GS1 represents gamma correction data corresponding to the current frame frequency. In order to store the first gamma correction data GS1, a space of eight bits or more may be allocated to the parameter storage unit (not illustrated).

The second gamma correction data GS2 represents gamma correction data corresponding to the frame frequency to be changed. In order to store the second gamma correction data GS2, a space of eight bits or more may be allocated to the parameter storage unit (not illustrated).

The dimming controller 121 of FIG. 1 may obtain gamma correction data corresponding to each of the N frame frequencies changed gradually using Equation 3 below.

$$i^{th}\ \text{gamma correction data} = GS1 + \frac{(GS2 + GS1)}{(N+1)} \times i \quad \text{[Equation 3]}$$

$$(1 \le i \le N, \text{ and } i \text{ is an integer})$$

A process in which the frame frequency and the gamma correction data are gradually changed according to the parameters input to the dimming controller 121 of FIG. 1 will be described in the following first to fourth examples.

FIGS. 4A to 4D are timing diagrams illustrating the process in which the light emission control signal and the source voltage are changed according to the parameters input to the dimming controller.

In the first to fourth examples, a process is illustrated in which each of duty periods T1 to T4 of light emission control signal EM and a source voltage SRC corresponding to gamma correction data are gradually changed when a frame frequency is changed from 60 Hz to 90 Hz.

Further, first and second duty ratios D1 and D2 are set to 20% and 80%, respectively, and when a duty ratio of the light emission control signal EM ranges from 20% to 80%, the frame frequency and the gamma correction data may be set to be gradually changed. In the first to fourth examples, the duty ratio of the light emission control signal EM is 50%.

In FIGS. 4A to 4D, the first to fourth duty periods T1 to T4 represent duty periods of the light emission control signal EM when the frame frequencies are 60 Hz, 70 Hz, 80 Hz, and 90 Hz, respectively. In one frame, the light emission control signal EM may have the same duty period. Further, it is indicated that one frame starts when a gate start pulse GSP is in an on state.

Figure 4A:
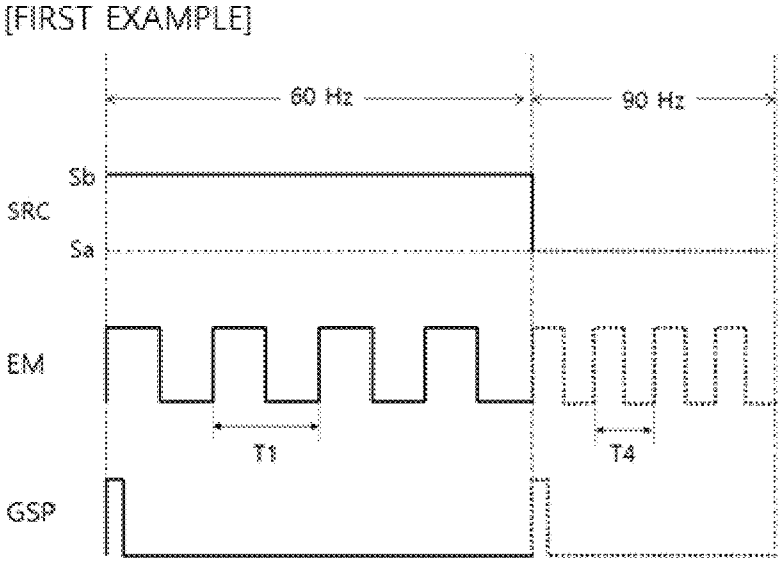
FIGS. 4A to 4D are timing diagrams illustrating a process in which a light emission control signal and a source voltage are changed according to a parameter input to a dimming controller.

In the first example illustrated in FIG. 4A, a dimming control GDC_ON is set to be in an off state.

Since the dimming control GDC_ON is in the off state, the dimming controller 121 of FIG. 1 does not gradually change the frame frequency and the gamma correction data regardless of other parameters.

As illustrated in the timing diagram, it can be seen that the frame frequency is directly changed from 60 Hz to 90 Hz without going through gradual steps. In this case, the duty period of the light emission control signal EM is changed from a first duty period T1 to a fourth duty period T4 smaller than the first duty period T1.

Further, it can be seen that the source voltage SRC is also immediately changed from a B level Sb to an A level Sa without going through the gradual steps.

Figure 4B:
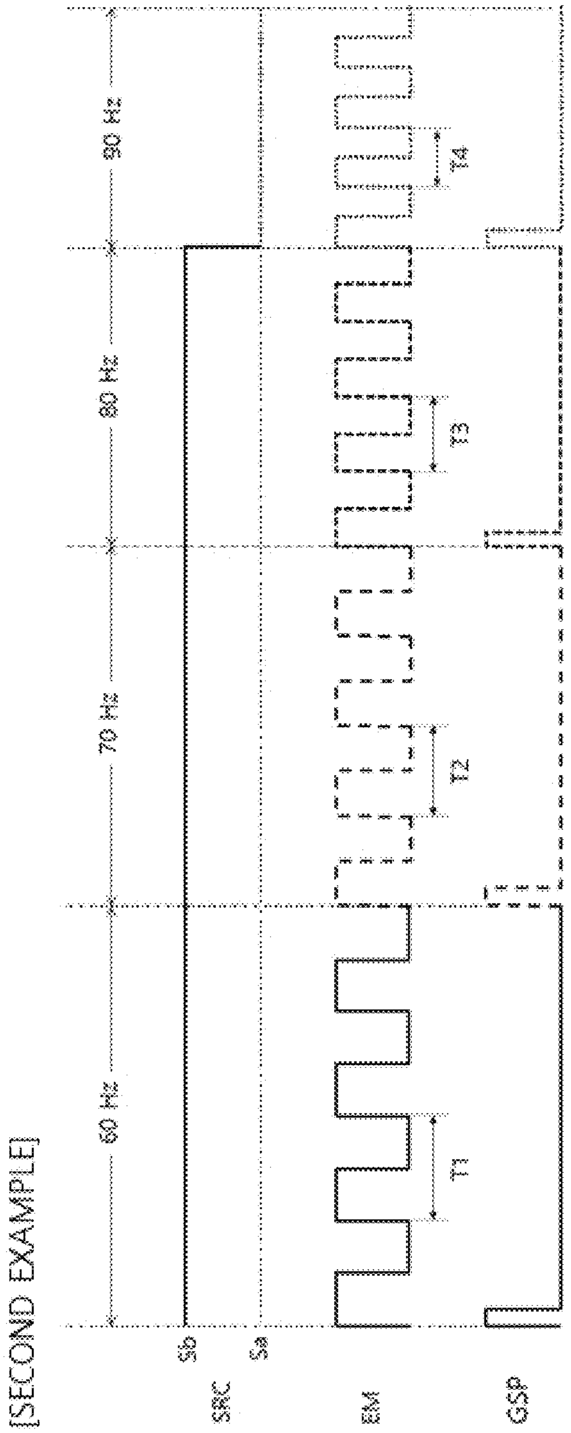

In the second example illustrated in FIG. 4B, a dimming control GDC_ON is set to be in an on state. Further, the number N of frequencies is set to two, an EM control GDC_EVST_EN is set to be in an enabled state, a source control GDC_SRC_EN is set to be in a disabled state, and the number of M of duties is set to four.

In the second example, a frame frequency is gradually changed and a tolerance d becomes (90−60)/(2+1)=10 according to Equation 1 above. Therefore, two different frame frequencies appearing in the gradual change process of the frame frequency may be 70 Hz and 80 Hz according to Equation 2 above.

In the timing diagram, it can be seen that the frame frequencies form an arithmetic sequence with the tolerance d of 10 Hz in the order of 60 Hz, 70 Hz, 80 Hz, and 90 Hz and are gradually changed. In this case, a duty period of a light emission control signal EM is changed in the order of first to fourth duty periods T1 to T4. Among lengths of the duty periods, the length of the first duty period T1 is longest, and the lengths are reduced in the order of the second, third, and fourth duty periods T2, T3, and T4.

Further, it can be seen that the number of light emission control signals EM appearing in one frame is four according to the number of M of duties.

However, since the source control GDC_SRC_EN is set to be in the disabled state, it can be seen that a source voltage SRC does not go through gradual steps and when a frame frequency becomes 90 Hz, which is a frame frequency after the change, the source voltage SRC is immediately changed from a B level Sb to an A level Sa.

Figure 4C:
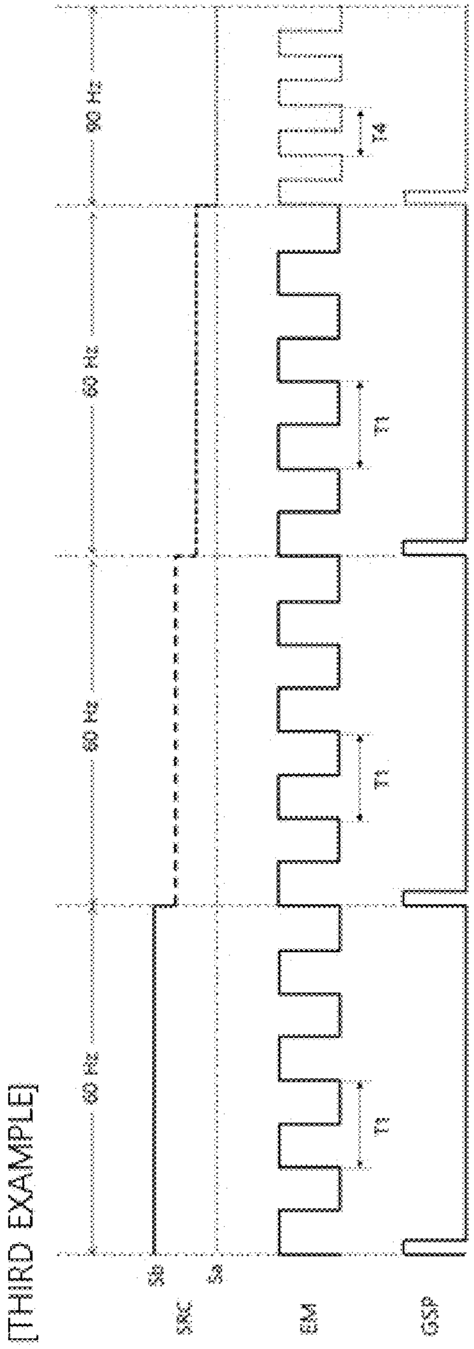

In the third example illustrated in FIG. 4C, a dimming control GDC_ON is set to be in an on state. Further, the number N of frequencies is set to two, an EM control GDC_EVST_EN is set to be in a disabled state, a source control GDC_SRC_EN is set to be in an enabled state, and the number of M of duties is set to four.

Unlike the second example, since the EM control GDC_EVST_EN is set to be in the disabled state, it can be seen that a frame frequency is changed from 60 Hz to 90 Hz without going through gradual steps. In this case, a duty period of a light emission control signal EM is changed from a first duty period T1 to a fourth duty period T4 smaller than the first duty period T1.

However, since a source control GDC_SRC_EN is set to be in the enabled state, it can be seen that a source voltage SRC is changed from a B level Sb to an A level Sa with going through gradual steps.

Figure 4D:
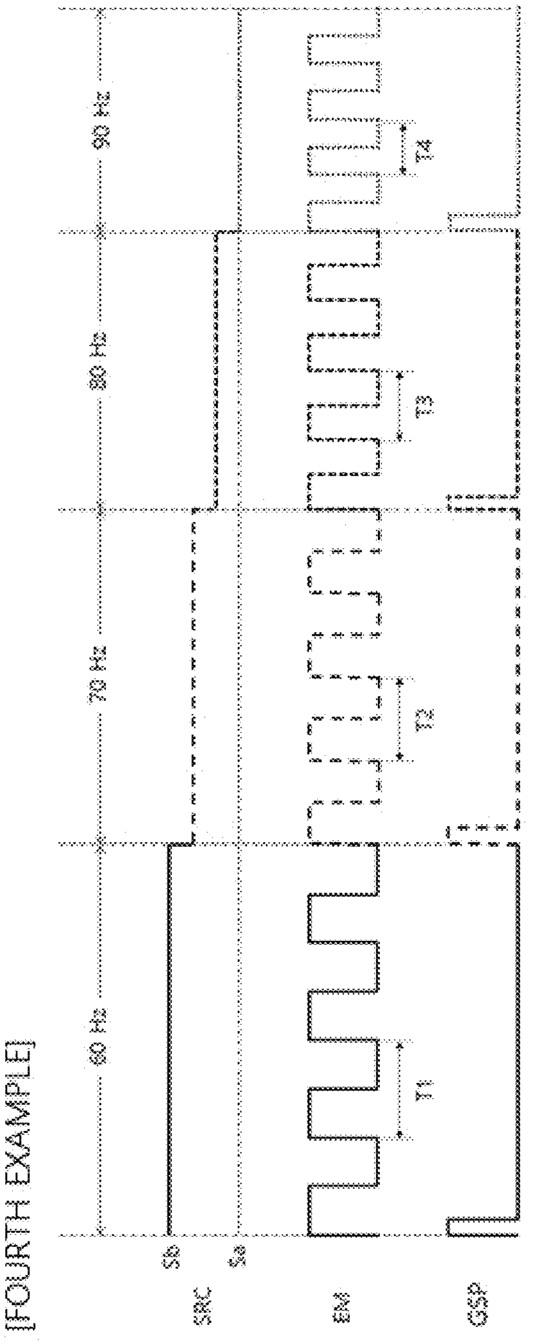

In the fourth example illustrated in FIG. 4D, a dimming control GDC_ON is set to an on state. Further, the number N of frequencies is set to two, an EM control GDC_EVST_EN is set to be in an enabled state, a source control GDC_SRC_EN is set to be in a disabled state, and the number of M of duties is set to four.

Since the EM control GDC_EVST_EN is set to be in the enabled state, it can be seen that the frame frequencies form an arithmetic sequence with a tolerance d of 10 Hz in the order of 60 Hz, 70 Hz, 80 Hz, and 90 Hz and are gradually changed as in the second example. In this case, a duty period of a light emission control signal EM is changed in the order of first to fourth duty periods T1 to T4.

Further, since the source control GDC_SRC_EN is set to be in the enabled state, it can be seen that a source voltage SRC is changed from a B level Sb to an A level Sa through gradual steps as in the third example.

As described above, in an embodiment of the present disclosure, when the frame frequency is changed, the frame frequencies, the duty period of the light emission control signal EM, and the source voltage SRC may be gradually changed.

Figure 5A:
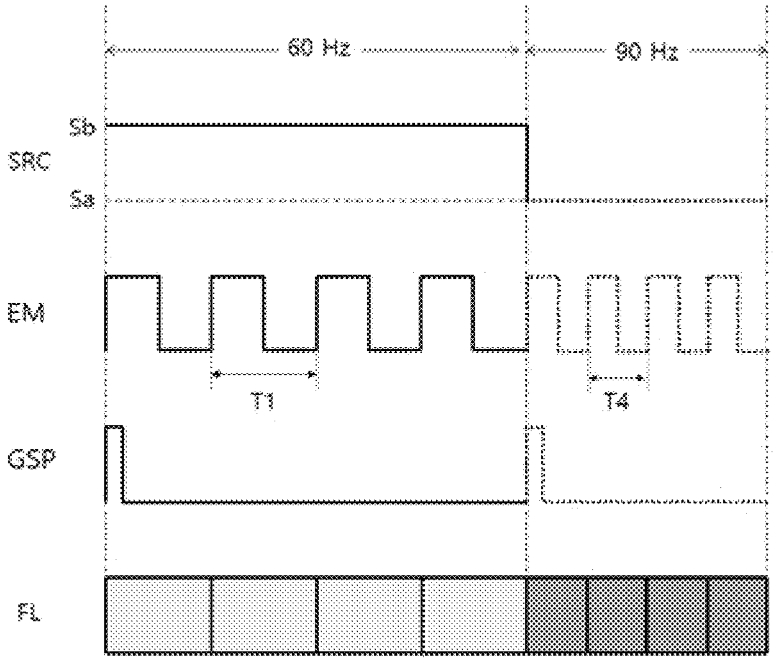
FIGS. 5A and 5B are diagrams illustrating effects in which a change in luminance is recognized in first and fourth examples of the present disclosure.
Figure 5B:
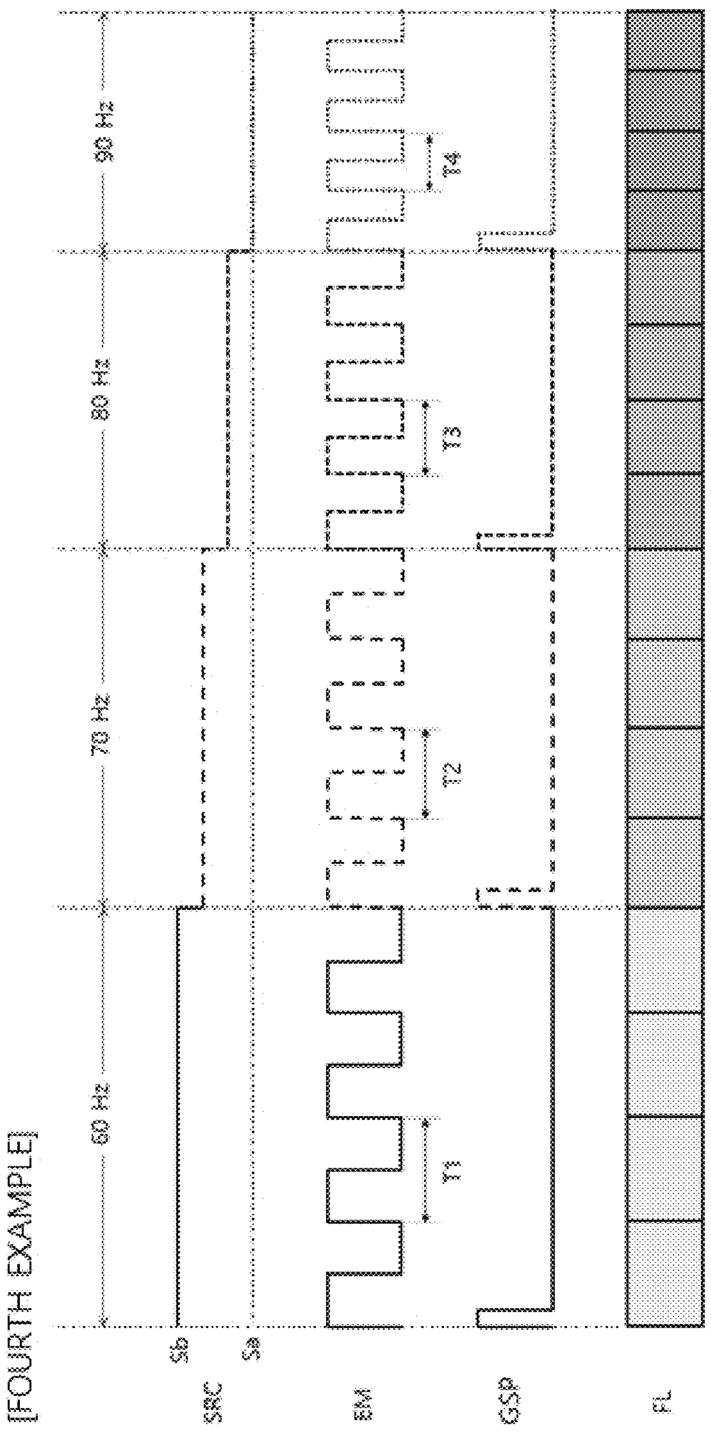

FIGS. 5A and 5B are diagrams illustrating effects in which a change in luminance is recognized in the first and fourth examples of the present disclosure.

In the first example illustrated in FIG. 5A, since a frame frequency and gamma correction data are not gradually changed, the frame frequency is changed from 60 Hz to 90 Hz, and a duty period of a light emission control signal EM is changed from a first duty period T1 to a fourth duty period T4. Further, a source voltage SRC is immediately changed from a B level Sb to an A level Sa.

Accordingly, a grayscale of an image at 60 Hz is rapidly changed to the grayscale of the image at 90 Hz so that a change in luminance FL for each frame may be recognized.

In the fourth example illustrated in FIG. 5B, the frame frequency and the gamma correction data are gradually changed.

Since the grayscales of the image at 70 Hz and 80 Hz appear between the grayscale of the image at 60 Hz and the grayscale of the image at 90 Hz, the luminance FL for each frame may be gradually changed and thus a change in luminance FL for each frame may not be recognized.

As described above, in the present disclosure, when a frame frequency is changed, a frame frequency and gamma correction data can be gradually changed and thus a user cannot recognize a change in luminance.

Further, when a duty ratio of a light emission control signal is within a predetermined range, a frame frequency and gamma correction data can be gradually changed and thus the gradual change can be performed in a region in which a change in luminance can be recognized.

As described above, the present disclosure has been described in the above embodiments, but various modifications may be made without departing from the scope of the present disclosure.

What is claimed is:

1. A display device comprising:

a display panel including a plurality of pixel regions;

a gate driver configured to sequentially supply light emission control signals to horizontal lines of the display panel;

a data driver configured to supply a source voltage corresponding to a data signal, corrected by gamma correction data, to the display panel; and a dimming controller configured to control whether to gradually change a frame frequency and the gamma correction data according to a duty ratio of the light emission control signals, wherein the dimming controller receives a first duty ratio and a second duty ratio as inputs, and when the duty ratio of the light emission control signals is within a range from the first duty ratio to the second duty ratio, the dimming controller controls the frame frequency and the gamma correction data so as to be gradually changed such that N frames having N frame frequencies (N is a natural number not less than 3) between a first frame frequency of a first frame and a second frame frequency of a second frame are generated between the first frame and the second frame, and when the duty ratio of the light emission control signals is outside the range from the first duty ratio to the second duty ratio, the dimming controller does not control the frame frequency and the gamma correction data so as to be gradually changed.

2. The display device of claim 1, wherein the dimming controller receives a first frame frequency (F1), a second frame frequency (F2), and the number (N) of frequencies as inputs and controls frames having first to $N^{th}$ frequencies so as to be generated between a frame before the frame frequency is changed and another frame after the frame frequency is changed.

3. The display device of claim 2, wherein the first to $N^{th}$ frequencies are set according to a following equation:

$$i^{th}\text{ frequency} = F1 + \frac{(F2 - F1)}{(N+1)} \times i \quad \text{[Equation]}$$

($1 \le i \le N$, and $i$ is an integer).

4. The display device of claim 3, wherein the dimming controller receives number (M) of duties as an input and controls the light emission control signals so as to be generated as much as the number (M) of duties in one frame.

5. The display device of claim 2, wherein the dimming controller receives first gamma correction data (GS1) and second gamma correction data (GS2) as inputs, and when the frames having the first to $N^{th}$ frequencies are output, the dimming controller sets pieces of first to $N^{th}$ gamma correction data according to a following equation:

$$i^{th}\text{ gamma correction data} = GS1 + \frac{(GS2 - GS1)}{(N+1)} \times i \quad \text{[Equation]}$$

($1 \le i \le N$, and $i$ is an integer).

6. The display device of claim 1, wherein the gate driver includes a shift register having a plurality of stages that are dependently connected, and wherein the stages sequentially output gate driving signals.

7. The display device of claim 6, wherein the gate driving signals include a scan signal and a light emission control signal.

8. The display device of claim 6, wherein the stages each includes a set input terminal, a reset input terminal, a gate driving signal output terminal, and a gate shift clock output terminal, and wherein the gate shift clock output terminal is connected to the reset input terminal of one of the stages which is as far away as number of k previously, and is connected to the set input terminal of another one of the stages which is as far away as the number of k afterward.

9. The display device of claim 8, wherein, when number of the stages is h, the number of k ranges from 1 to h−1.

10. The display device of claim 8, wherein a gate start pulse is input to the set input terminal of a first stage of the shift register.

11. The display device of claim 8, wherein the gate driving signal output terminal of the stage is connected to a gate line located for each horizontal line of the display panel.

12. The display device of claim 8, wherein the stages each outputs a gate shift clock so that the one of the stages which is as far away as the number of k previously is disabled and the another one of the stages which is as far away as the number of k afterward is enabled.

13. The display device of claim 1, further comprising a gamma correction unit in which the gamma correction data is stored and which generates the source voltage according to the gamma correction data and transmits the source voltage to the data driver.

14. The display device of claim 1, wherein the dimming controller receives a source control signal as input, which allows the dimming controller to determine whether to gradually change the gamma correction data.

15. The display device of claim 14, wherein when the source control signal is in an enabled state, a level of the source voltage is gradually changed; and when the source control signal is in a disabled state, the level of the source voltage is not gradually changed.

16. A method of driving a display device, the method comprising:

inputting a first duty ratio and a second duty ratio;

inputting a first frame frequency (F1), a second frame frequency (F2), the number (N) of frequencies, whether or not gradual dimming control is on, and duty ratios of a light emission control signals; and controlling a frame frequency and gamma correction data so as to be gradually changed such that N frames having N frame frequencies (N is a natural number not less than 3) between a first frame frequency of a first frame and a second frame frequency of a second frame are generated between the first frame and the second frame when the gradual dimming control is in an on state and the duty ratio of the light emission control signal is within a range from the first duty ratio to the second duty ratio, and not controlling the frame frequency and the gamma correction data so as to be gradually changed when the gradual dimming control is in an off state and the duty ratio of the light emission control signal is outside the range from the first duty ratio to the second duty ratio.

17. The method of claim 16, wherein controlling of the frame frequency and the gamma correction data so as to be gradually changed includes controlling frames having first to $N^{th}$ frequencies so as to be generated between a frame before the frame frequency is changed and a frame after the frame frequency is changed.

18. The method of claim 17, wherein the first to $N^{th}$ frequencies are set according to the following equation:

$$i^{th}\text{ frequency} = F1 + \frac{(F2 - F1)}{(N+1)} \times i \quad \text{[Equation]}$$

($1 \le i \le N$, and $i$ is an integer).

19. The method of claim 18, further comprising:

inputting number (M) of duties; and controlling the light emission control signals so as to be generated as much as the number (M) of duties in one frame.

20. The method of claim 17, wherein further comprising:

inputting first gamma correction data (GS1) and second gamma correction data (GS2); and when the frames having the first to $N^{th}$ frequencies are output, setting pieces of first to $N^{th}$ gamma correction data according to the following equation:

$$i^{th} \text{ gamma correction data} = GS1 + \frac{(GS2 - GS1)}{(N+1)} \times i \quad \text{[Equation]}$$

$(1 \leq i \leq N$, and $i$ is an integer).

21. The method of claim 16, further comprising:

generating a source voltage according to the gamma correction data and correcting a data signal inputted to the display device by the source voltage.

22. The method of claim 21, further comprising:

inputting a source control signal which allows determining whether to gradually change the gamma correction data.

23. The method of claim 22, wherein when the source control signal is in an enabled state, a level of the source voltage is gradually changed; and when the source control signal is in a disabled state, the level of the source voltage is not gradually changed.

24. A display device comprising:

a display panel including a plurality of pixel regions;

a gate driver configured to sequentially supply light emission control signals to horizontal lines of the display panel;

a data driver configured to supply a source voltage corresponding to a data signal, corrected by gamma correction data, to the display panel; and a dimming controller configured to control whether to gradually change a frame frequency and the gamma correction data according to a duty ratio of the light emission control signals, wherein the dimming controller receives a first duty ratio and a second duty ratio as inputs, and when the frame frequency is changed from a first frame frequency of a first frame to a second frame frequency of a second frame and the duty ratio of the light emission control signals is within a range from the first duty ratio to the second duty ratio, the dimming controller controls the frame frequency and the gamma correction data so as to be gradually changed such that N frames having N frame frequencies (N is a natural number not less than 3) between the first frame frequency and the second frame frequency are generated between the first frame and the second frame.

25. The display device of claim 24, wherein the light emission control signals have a same duty period in one frame, and duty periods of the N frames are between a first duty period of the first frame and a second duty period of the second frame.

* * * * *